Jan. 30, 1968 K. G. KING 3,366,866

INVERTER CIRCUITS CAPABLE OF MODIFIED OPERATIONAL MODE UNDER OVERLOAD

Filed March 31, 1965 2 Sheets-Sheet 1

United States Patent Office 3,366,866
Patented Jan. 30, 1968

3,366,866

INVERTER CIRCUITS CAPABLE OF MODIFIED OPERATIONAL MODE UNDER OVERLOAD

Kenneth G. King, King's Cross, London, England, assignor to Westinghouse Brake and Signal Company, Limited, London, England Filed Mar. 31, 1965, Ser. No. 444,110
Claims priority, application Great Britain, Apr. 2, 1964, 13,599/64
4 Claims. (Cl. 321—14)

ABSTRACT OF THE DISCLOSURE

An inverter circuit is provided which includes first and second semi-conductor switching devices operable at a predetermined frequency to apply a direct current input cyclically and alternately in opposite directions to an output circuit including a capacitor, each switching device having an associated resonant circuit which includes the capacitor and an inductance connected in series with the respective switching device and which has a resonant frequeny not less than the operating frequency, said series-connected inductance comprising the principle inductance of the resonant circuit, a rectifier path being connected in reverse parallel with each switching device whereby when each switching device is rendered non-conducting its associated rectifier path permits the reverse flow of current in and under the effect of the associated resonant circuit to assist the discharge of the capacitor and the recharging thereof with the opposite polarity by the flow of current through the other switching device in the other resonant circuit, this effect being repeated cyclically and alternately. The inverter circuit additionally includes further semi-conductor switching devices and means for rendering the switching devices conducting under overload conditions of the circuit. When the further semi-conductor switching means are rendered conductive a modified mode of operation of the circuit is produced wherein when one of the first and second semi-conductor switching devices is rendered conducting during normal operation the voltage on the capacitor is connnected through a path which excludes the principle inductance of the respective associated resonant circuit across the other of the first and second semi-conductor devices to render the latter non-conducting and vice-versa.

In co-pending application Ser. No. 163,842 now U.S. Patent 3,242,415, issued on Mar. 22, 1966, hereafter referred to as the parent specification, there is described and claimed an inverter circuit which includes two semiconductor switching devices arranged to be operated at a predetermined frequency to apply a direct current input cyclically and alternately in opposite directions to an output circuit including a capacitor and arranged to deliver an alternating current output, wherein each switching device has an associated resonant circuit which includes the capacitor and an inductor connected in series with the switching device and which has a resonant frequency not less than the operating frequency, and wherein a rectifier is connected in reverse parallel with each switching device, whereby when each switching device is switched off, its associated rectifier permits the reverse flow of current in and under the effect of the associated resonant circuits to assist the discharge of the capacitor and its recharging with opposite polarity by the flow of current through the other switching device in the other resonant circuit, this effect being repeated cyclically and alternately.

According to the present invention there is provided an inverter circuit which includes two switching devices operable at a predetermined frequency to apply a direct current input cyclically and alternately in opposite directions to an output circuit including a capacitor and arranged to deliver an alternating current output, each switching device having an associated resonant circuit which includes the capacitor and an inductance connected in series with the respective switching device and which has a resonant frequency not less than the operating frequency, a rectifier path being connected in reverse parallel with each switching device whereby when each switching device is rendered non-conducting its associated rectifier path permits the reverse flow of current in and under the effect of the associated resonant circuit to assist the discharge of the capacitor and its recharging with opposite polarity by the flow of current through the other switching device in the other resonant circuit, this effect being repeated cyclically and alternately, and modifying means being provided (responsive to loading conditions of the circuit) to modify the circuit to operate as a parallel inverter circuit whilst an overload condition pertains.

In order that the invention may be more clearly understood and readily carried into effect the same will be further described by way of example only with reference to the accompanying drawing in which.

Figure 1:
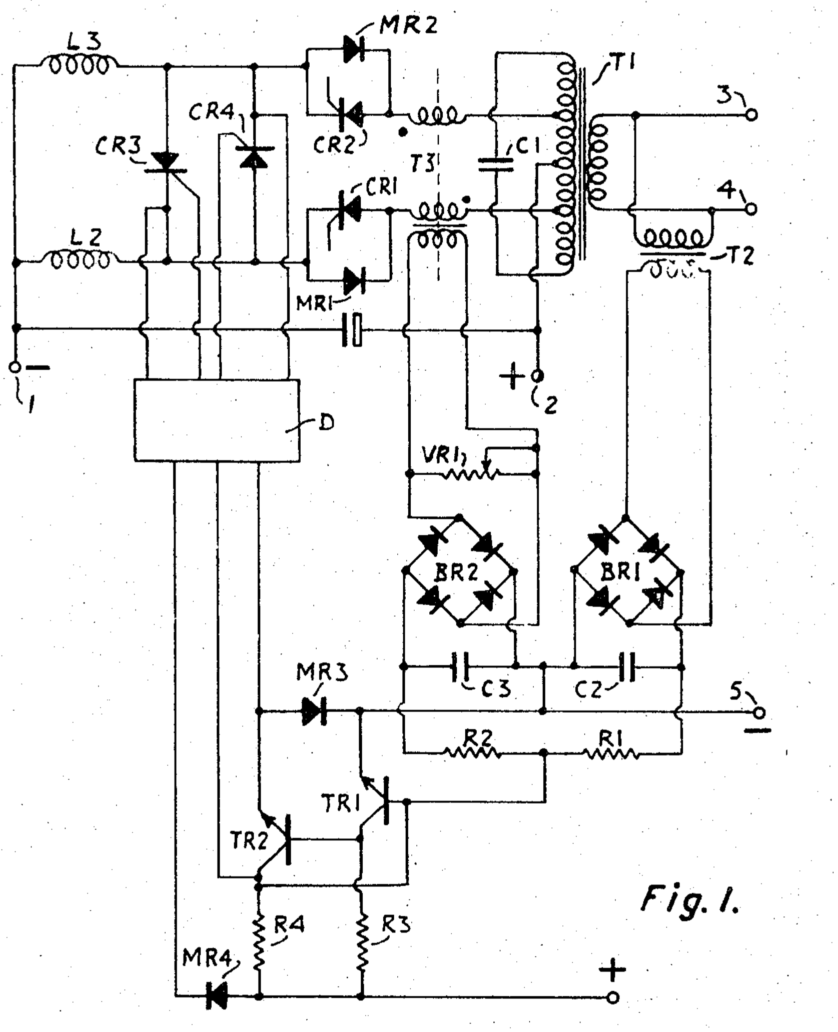
FIG. 1 illustrates one embodiment of the invention.

Referring to FIG. 1 of the drawing, there is shown therein a series inverter of the same general type as that described in the parent specification. The negative direct current inverter supply terminal 1 is connected via respective ones of a pair of chokes L2 and L3 as shown and respective controllable rectifier devices CR1 and CR2 and primary windings of an additional current transformer T3 of a transformer T1. The secondary winding of T1 is connected to the inverter output terminals 3 and 4. The centre tapping of the primary winding of T1 is connected directly to the positive supply terminal 2 to the inverter. In parallel with CR1 and CR2 there are connected respective diodes indicated MR1 and MR2, with opposite polarity to CR1 and CR2. An output circuit tuning capacitor C1 is connected across the terminals of the primary winding of T1 and is so chosen in relation to the circuit inductance as to tune the circuit to a frequency close to the operating frequency under normal operating load conditions, it being understood that the actual operating frequency is determined by the repetition frequency of driving signals to the devices CR1 and CR2.

In operation of the circuit arrangement as so far described, the controllable rectifier devices CR1 and CR2 are rendered conducting alternately at the output frequency and assuming, in the first instance, that CR1 is rendered conducting, current flows via the inductance L1 from the negative supply terminal, through L2, CR1 and the appropriate portion of the primary winding of T1. The capacitor C1 therefore becomes charged to apply an approximately sinusoidal voltage rise to the load via the secondary winding of T1, provided that the load is not of an excessively low impedance. A point of maximum voltage is thus achieved across the capacitor C1 and on the tendency of C1 to discharge in the opposite direction, CR1 becomes non-conducting and following this the controllable rectifier device CR2 is rendered conducting by the driving circuit thereto. At the same time, the voltage on the capacitor C1 is falling via the diode MR1, the reversal of charge on C1 being assisted by current flow from the direct current supply via L3 and the controllable rectifier device CR2. When the reverse voltage maximum on C1 is reached the controllable rectifier device CR2 becomes non-conducting on the current tending to run in the opposite direction and the process repeats itself, a reverse flow of current passing via the diode MR2 assisted by further current flow via the controllable rectifier device CR1.

The mode of operation of the circuit arrangement is described in greater detail in the parent specification and will not be discussed in greater detail herein. However, it will be understood that a symmetrical mode of operation is achieved and the presence of the diodes MR1 and MR2 in parallel with the controllable rectifier devices CR1 and CR2 respectively, enables a forward and reverse passage of current between the load circuit and the direct current supply source. It will be appreciated moreover that the turning off of the controllable rectifier devices CR1 and CR2 in respective half cycles of the output waveform of the inverter arrangement, is achieved naturally by virtue of the oscillatory charge developed in the tuning capacitor C1. If a severe overload is presented to the output terminals 3 and 4 this natural commutation which forms the basis of the normal operation tends to fail because the tuned circuits become too heavily damped to allow the controllable rectifier currents to fall to zero. This for certain applications of inverter circuits of this type may be a substantial disadvantage.

In accordance with the present invention, means is included in the form of two oppositely poled controllable rectifier devices CR3 and CR4 connected across the junctions of the tuning inductance L2 and L3 with the respective controllable rectifier devices CR1 and CR2, whereby the mode of operation of the inverter may be modified to be equivalent to that of a parallel inverter. Thus, under overload conditions, the controllable rectifier devices CR3 and CR4 are rendered conducting and therefore virtually a short circuit is provided across the terminals thereof in either direction. Under these conditions, the inductances L2 and L3 merely combine to form a supply D.C. choke. In operation of the arrangement in this form, the capacitor C1 is usually much larger than is necessary to provide commutation on the controllable rectifier devices and therefore adequate charge is provided for rendering one controllable rectifier device, say CR2, non-conducting when the other controllable rectifier device, say, CR1, is rendered conducting and vice versa.

The remaining parts of the circuit yet to be discussed constitute means which are responsive to the impedance of the load which is connected across 3 and 4 and which controls CR3 and CR4 according to whether overload exists or not. In the present arrangement, means is provided for comparing the output voltage of the inverter with current thereby to give an indication of the load impedance. Thus the primary winding of a transformer T2 is connected across the secondary winding of T1 to give an indication of output voltage. The primary windings of a current transformer T3 are, as mentioned above, connected in series with the devices CR1 and CR2, to give an indication of current. T3 is associated with the input side of T1 to avoid false current indication which could arise if T3 had only a single winding in series with the output, due to possible saturation in the transformer T. The secondary winding of T2 is connected via a bridge rectifier BR1 across a capacitor C2 and the secondary winding of T3 is connected to a bridge rectifier BR2 the direct current terminals of which are connected across a capacitor C3. A variable resistor VR1 is connected in parallel with T3 to provide for an appropriate amount of adjustment for proportionality. Capacitors C2 and C3 are connected in series and in parallel with this series combination there are connected a pair of series resistors R1 and R2. The junction of R1 and R2 is connected to the base electrode of a transistor TR1, the emitter electrode of which is connected to the junction of C2 and C3 and to a negative supply terminal 5. The collector electrode of TR1 is connected via a series resistor R3 to the corresponding positive supply terminal 6 and the latter collector electrode is connected to the base electrode of a further transistor TR2. TR2 has a collector resistor R4 via which the collector is connected to the positive supply terminal 6 and the emitter electrode of TR2 is connected via a diode MR3 to the negative supply line. A feedback connection is provided between the collector electrode of TR2 and the base electrode TR1 so that TR1 and TR2 form a bistable trigger circuit.

The driver circuit for the controllable rectifier devices CR3 and CR4 is denoted by the block D and may be of any suitable form to provide continuous drive on these controllable rectifiers whilst the potential at the collector electrode of TR2 attains a predetermined value corresponding to TR2 being conducting.

Capacitors C2 and C3 are typically chosen to be equal capacitors and resistors R1 and R2 are typically chosen to be equal resistors. When the charge on the capacitor C3 increases relative to that on capacitor C2 this indicates an increase in load across terminals 3 and 4. If this attains a critical overload value adjusted by the setting of VR1, the voltage applied to the base electrode of TR1 becomes so negative with respect to the emitter electrode of TR1 that the latter transistor, which is normally conducting, becomes non-conducting and TR2 becomes conducting to apply a negative bias to the driver circuit D. This has the effect of causing D to apply a driving potential to the controllable rectifier devices CR3 and CR4 such that the inverter reverts from normal series operation to operation in the manner of a parallel inverter as described earlier. When the load impedance presented to terminals 3 and 4 increases again beyond critical value, the trigger circuit comprising TR1 and TR2 reverts to its normal condition and the drive on CR3 and CR4 is removed. The latter controllable rectifier devices subsequently become non-conducting because of the normal commutation effect on these devices.

The charging and discharging time constants of the circuits associated with the capacitors C1 and C2 in the voltage and current sensing arrangement may be so chosen that the system responds very rapidly to any reduction in load impedance and recovers sufficiently slowly to maintain the conducting condition in the controllable rectifier devices CR3 and CR4 without interruption until the overload is removed, when normal operation is restored after an insignificant delay.

In the circuit described above, it is envisaged that by virtue of the overwinds on the transformer T1 and the fact that C1 is connected via a winding of T1, there is sufficient inductance in series with the discharge path of this capacitor to limit to a safe value the rate of rise of current in the controllable rectifier devices under turn-off conditions and prolong the discharge sufficiently to give adequate recovery time for the particular device concerned to be turned off. In the event of the capacitor in the circuit not being so connected or the series inductance not being sufficient to achieve this, a small inductance may be added in series to the respective discharge paths concerned. For example, the paths including MR1 and MR2 in parallel with CR1 and CR2 may have small added inductances. This will also allow CR1 and CR2 to receive adequate reverse pulses which are of sufficient duration.

Again, if protection against the effects of complete short circuit loads is required, sufficient impedance must be present between C1 and the load terminals. In the present circuit arrangement, it is envisaged that the leakage inductance of the transformer T1 will provide this but if the arrangement is used which does not provide such inductance, a suitable small impedance may be required to be added.

Although not indicated in the foregoing, it has been found that when a circuit arrangement as described is operating under overload conditions as a parallel inverter, it is preferable to provide means for ensuring that the triggering pulses to the controllable rectifiers CR1 and CR2 are extended beyond a length merely sufficient to achieve turn-on. By so doing, instability in the form of a discontinuous supply current and a further tendency for the inverter to cease operation may be averted.

In a circuit arrangement in accordance with the invention, the effectiveness of the capacitor, such as C1 in FIG. 1, as a commutating capacitance in the overload condition of the circuit may be enhanced by the addition of small saturable reactors having main windings in series with the controllable rectifier devices. Such saturable reactors may be placed as SR1 and SR2 as shown in FIG .2. The small biasing windings connected in series with the inverter supply are so poled as to counteract the effects of magnetising current in the saturable reactors in the unsaturated condition thereof such that they provide more complete blocking then would otherwise be the case. The effect of providing such saturable reactors, is, as explained in greater detail in the specfiication of co-pending patent application Ser. No. 479,264 nearly to double the time which is available to the controllable rectifiers, for a given commutating capacitance in the inverter operating in the parallel mode, to regain their forward blocking capability on turn-off.

Figure 3:
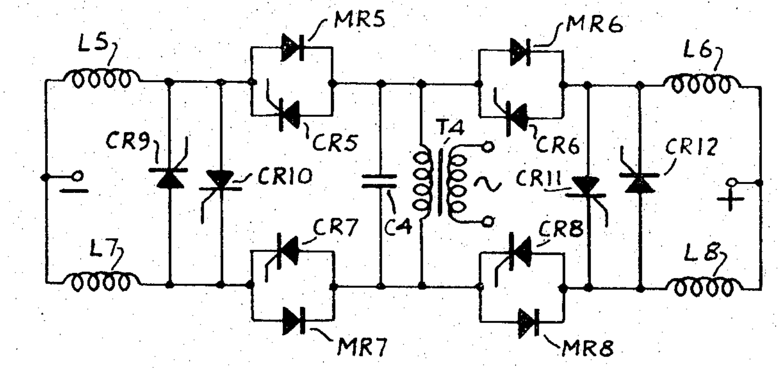
FIG. 3 illustrates a bridge type of inverter to which the invention is applied.

An alternative circuit having a bridge configuration is shown in the accompanying FIG. 3 the main controllable rectifiers of the inverted comprising the devices CR5, CR6, CR7 and CR8 having respective parallel diodes MR5, MR6, MR7, and MR8.

The tuned load circuit comprises the capacitor C4 and output transformer T4 and when the opposed pairs of devices CR5 and CR8 and CR6 and CR7 are alternately rendered conducting, current is drawn via the pairs of inductances L5 and L8 or L6 and L7 respectively to charge C4 alternately in opposite directions. This circuit can have similar shortcomings on overload conditions to the basic inverter circuit of FIG. 1 but by providing the oppositely poled pairs of controllable rectifier devices CR9 and CR1 and CR11 and CR12 as shown, which are rendered conducting under overload conditions, the inverter may operate in a parallel mode whilst such a condition pertains.

The means for detecting the existence of the overload conditions may be similar to that described with reference to FIG. 1, namely, by detecting current and output voltage and comparing them to indicate the presence of an excessively low load impedance. The remainder of the circuit, therefore, appears not to require further description herein.

Figure 2:
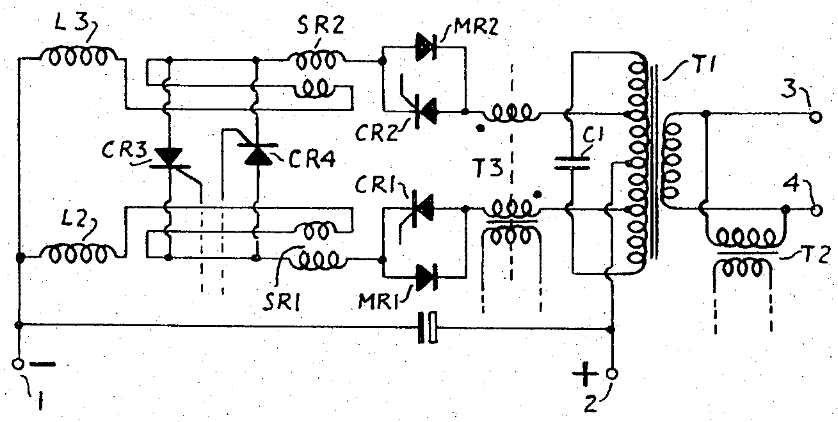
FIG. 2 illustrates a modification of the circuit arrangement of FIG. 1.

Similar precautions to take greater advantage of the capacitance C4 for turn-off commutation to those described in the foregoing and more particularly with reference to FIG. 2 may also be employed in the basic bridge circuit of FIG. 3.

As an alternative to the manner of connection of the added controllable rectifier devices which provide for parallel operation and under overload conditions, and referring for example to FIG. 1, CR3 could have its anode connection to the anode of CR2 instead of the cathode and CR4 could similarly have its anode connected to that of CR1 and the manner of operation remains substantially the same. In this modification, however, it will be seen that the commutating voltage provided by the capacitor C1 for one device is greater by the forward voltage drop across the other controllable rectifier device, as compared with the arrangement of FIG. 1.

I claim:

1. An inverter circuit which includes two semiconductor switching devices operable at a predetermined frequency to apply a direct current input cyclically and alternately in opposite directions to an output circuit including a capacitor, each switching device having an associated resonant circuit which includes an inductance connected in series with the respective switching device and the capacitor and which has a resonant frequency not less than the operating frequency, a rectifier path being connected in reverse parallel with each switching device whereby when each switching device is rendered non-conducting its associated rectifier path permits the reverse flow of current in and under the effect of the associated resonant circuit to assist the discharge of the capacitor and the recharging thereof with opposite polarity by the flow of current through the other switching device in the other resonant circuit, this effect being repeated cyclically and alternately, the circuit including switching means and means responsive to overload conditions for rendering said switching means conducting to produce a modified mode of operation of the circuit wherein when one of the semiconductor switching devices is rendered conducting the voltage on said capacitor is connected across the other switching device through a path which largely excludes the inductance of the resonant circuit associated with said conducting switching device to render said other switching device non-conducting.

2. An inverter circuit as claimed in claim 1 the sensing means including means for sensing the current supplied to the output circuit and for sensing the output voltage with comparison means for comparing these two quantities.

3. An inverter circuit as claimed in claim 1 wherein small saturable reactors selected to increase the available turn-off time for the devices for a given value of said capacitor are connected in series with respective of said switching devices.

4. An inverter circuit as claimed in claim 1 wherein said switching means comprises an oppositely poled pair of controllable rectifier devices connected between the respective series circuit paths including the semiconductor switching devices at the junctions between the semiconductor devices and their associated inductances.

References Cited

UNITED STATES PATENTS

| | | | |
|---|---|---|---|
| 3,197,691 | 7/1965 | Gilbert | 321—18 |
| 3,210,638 | 10/1965 | Walker | 321—45 XR |
| 3,242,415 | 3/1966 | King et al. | 321—45 |
| 3,303,407 | 2/1967 | Depenbrook et al. | 321—45 |
| 3,308,372 | 3/1967 | Young et al. | 321—45 |
| 3,317,816 | 5/1967 | Wilting | 321—45 |

JOHN F. COUCH, *Primary Examiner.*

W. SHOOP, *Assistant Examiner.*